Patented Oct. 25, 1932

1,883,878

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ACCELERATOR OF VULCANIZATION

No Drawing.   Application filed May 4, 1931.   Serial No. 535,073.

This invention relates to the provision of a new class of chemical compounds and to their use as accelerators of vulcanization in rubber. It has particular relation to the provision of a new class of benzothiazyl 2-sulfides for use as vulcanization accelerators.

Mercaptobenzothiazole, a compound having the formula

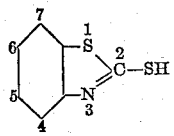

was first prepared by the chemist Hoffman by reacting amino thio phenol with carbon bisulfide. This compound suggested by Hoffman was later found to be an extremely powerful accelerator of vulcanization when incorporated into rubber. Since it may be manufactured quite economically and since it is nontoxic and may be incorporated into rubber with comparative ease, it has become one of the most important of commercial accelerators now upon the market.

This invention comprises the discovery that the simple mercaptobenzothiazole may readily be reacted with certain imids, such as alpha carbo diphenyl di-imid, having the formula $C_6H_5N=C=N-C_6H_5$, and triphenyl, guanidine, which is also an imid, to produce accelerators which are valuable for certain purposes.

The reaction product of the alpha carbo diphenyl di-imid and mercaptobenzothiazole may readily be prepared by heating the two materials in molecular proportions in benzene solution at a temperature of 200 to 220 degrees C. for a period of two or three hours in an autoclave. The reaction product may be obtained by evaporation of the benzene and may be purified by recrystallization from alcohol. It has a melting point of 127 to 130 degrees C. The following is the probable formula thereof

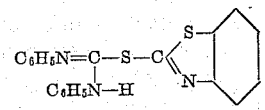

The corresponding reaction product of triphenyl guanidine and mercaptobenzothiazole is obtained by refluxing for a period of one hour equimolecular quantities of mercaptobenzothiazole and the guanidine in alcohol. Upon concentration of the alcoholic solution, the reaction product is precipitated as a yellow crystalline compound which, upon recrystallization, melts at a temperature of 116 to 118 degrees C. Quantitative analysis of the reaction product indicates that it comprises one mol of thiazole compound with a mol of guanidine.

The new materials may be employed as accelerators of vulcanization in most of the standard rubber compounds. However, the following is a specific example of a compound in which it has been found by experience that the materials are quite effective.

|  | Parts |
|---|---|
| Rubber | 100 |
| Zinc oxide | 5 |
| Sulfur | 3 |
| Stearic acid | 1.5 |
| Accelerator | .5 |

In order to test the efficiency of the new accelerators, samples of rubber prepared in accordance with the preceding formula in which the compounds were employed as accelerators were subjected to vulcanization for varying periods of time. Physical tests were then conducted upon the vulcanized samples for purposes of ascertaining the tensile strength and elasticity of the latter. The results of these tests are tabulated as follows:

| Cure | | Stress kgs/cm² at | | | Elongation at break |
|---|---|---|---|---|---|
| Time in mins. | Temp. °F. | 500% elong. | 700% elong. | Break | |
| ALPHA CARBO DIPHENYL DI-IMID DERIVATIVE OF MERCAPTOBENZOTHIAZOLE | | | | | |
| 20 | 260 | 8 | 15 | 32 | 850 |
| 40 | 260 | 17 | 55 | 94 | 785 |
| 80 | 260 | 26 | 99 | 136 | 750 |
| 60 | 285 | 23 | 74 | 96 | 740 |
| TRIPHENYL GUANIDINE REACTION PRODUCT OF MERCAPTOBENZOTHIAZOLE | | | | | |
| 20 | 260 | 13 | 39 | 72 | 815 |
| 40 | 260 | 21 | 76 | 136 | 790 |
| 80 | 260 | 29 | 110 | 130 | 725 |
| 60 | 285 | 26 | 90 | 113 | 740 |

It will be observed from the tabulated data that where mercaptobenzothiazole reaction products of either alpha carbo diphenyl di-imid or tri-phenyl guanidine are employed as vulcanization accelerators, rubber products having high tensile strength and elasticity are obtained within a relatively short time. Under similar conditions, stocks containing no accelerator are either not vulcanized at all or only partially so. The new accelerators may be prepared from relatively inexpensive materials and by simple and convenient methods. Since the compounds are crystalline materials, they may be handled in the factory with ease. They are therefore highly desirable from a commercial viewpoint.

Although I have disclosed and described in detail only the preferred forms of the invention, it will be apparent to those skilled in the art that the invention is not limited thereto but that various modifications may be made therein without departing from the spirit of the invention or from the scope of the appended claims.

What I claim is:

1. A method of treating rubber which comprises subjecting it to vulcanization in the presence of a carbo diphenyl di-imid reaction product of mercaptobenzothiazole.

2. A method of treating rubber which comprises subjecting it to vulcanization in the presence of a reaction product of a material selected from a class consisting of reaction products of mercaptobenzothiazole and carbo diphenyl di-imid and reaction products of mercaptobenzothiazole and triphenylguanidine.

3. A rubber product that has been vulcanized in the presence of a mercaptobenzothiazole of a material selected from a class consisting of carbo di-phenyl di-imid and triphenylguanidine.

4. A new chemical compound having the formula

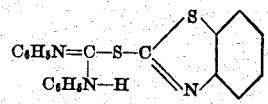

5. A new chemical compound comprising the reaction product of carbo diphenyl di-imid and mercaptobenzothiazole.

In witness whereof, I have hereunto signed my name at Akron, in the county of Summit and State of Ohio, U. S. A., this 1st day of May, 1931.

ALBERT M. CLIFFORD.